H. H. LINNELL & L. PARKER.
Drill-Teeth.

No. 152,294.　　　　　　　　　　　　Patented June 23, 1874.

Witnesses
John L. Boone
C. Milton Richardson

2. Leonidas Parker
1. Henry H. Linnell
by Dewey & Co.
Att'ys

UNITED STATES PATENT OFFICE.

HENRY H. LINNELL, OF SAN FRANCISCO, AND LEONIDAS PARKER, OF OAKLAND, CALIFORNIA.

IMPROVEMENT IN DRILL-TEETH.

Specification forming part of Letters Patent No. 152,294, dated June 23, 1874; application filed November 28, 1873.

*To all whom it may concern:*

Be it known that we, HENRY H. LINNELL, of San Francisco, and LEONIDAS PARKER, of Oakland, Alameda county, State of California, have invented an Improved Tooth for Seed-Drills and Planters; and we do hereby declare the following description and accompanying drawings are sufficient to enable any person skilled in the art or science to which it most nearly appertains to make and use our said invention or improvement without further invention or experiment.

The tule or swamp lands of the Pacific coast produce better crops of vegetation than any other portions of the country. These lands cannot be plowed and pulverized like ordinary soil, owing to their swampy character and the multiplicity of tough roots which are interwoven beneath the surface of the ground. The usual method heretofore employed for seeding this land has been to drive a flock of sheep over it, so as to tramp the grain in after it has been sown.

The object of our invention is to so construct the furrow-openers or teeth of grain-drills and seed-sowers that they will cut first and then open a furrow in this character of unplowed land, and thus permit of the seed being sown or drilled in the ordinary manner.

In order to explain our invention, so that others will understand its construction and operation, reference is had to the accompanying drawings, in which—

Figure 1:
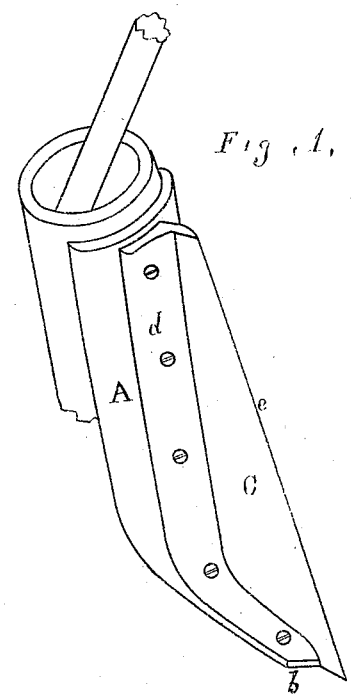
Figure 2:
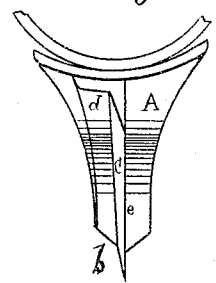

Figure 1 is a perspective view of our device. Fig. 2 is a top view.

A represents the concave shovel or shoe, which is secured upon the lower end of the grain-tube, so as to project down below it, and open the furrow for the reception of the seed. The lower end of this shoe I extend forward in a curve, so that its point $b$ shall be two or three inches in advance of the shoe, as shown.

To the front or convex side of the shoe I secure a thin steel plate, $c$, which is shaped as shown. This blade has a flange, $d$, secured to its back edge, which fits against the convex or front face of the shoe, so that it can be secured by rivets or bolts. The cutting-edge $e$ of the blade stands at an angle, as shown, and is sharpened, so that it will cut the soil in advance of the shoe or furrow-opener. The lower point or angle of the blade extends forward of the point $b$ of the shoe, so as to separate the sod or soil before the point of the shoe enters.

By employing a tooth or furrow-opener of this construction, an ordinary grain-drill or seed-sower can be employed on tule or swamp lands for planting or drilling in the seed.

The angular position of the cutting-edge $e$ will give a drawing cut, and thus easily separate the sod and roots. The wings of the shoe will then force the cut apart sufficiently to allow the seed to drop down into the furrow, and after the tooth has passed, the cut will close, leaving the seed properly planted or sown.

Having thus described our invention, what we claim, and desire to secure by Letters Patent, is—

A seed-drill tooth consisting of the curved shoe A, in combination with the removable cutter C, conforming on its inner surface to the front of the shoe, having a straight receding cutting-edge, $e$, and its lower point projecting beyond the point of the shoe, as set forth.

In witness whereof we hereunto set our hands and seals.

HENRY HARRISON LINNELL. [L. S.]
LEONIDAS PARKER. [L. S.]

Witnesses:
JOHN L. BOONE,
C. MILTON RICHARDSON.